Patented Aug. 15, 1944

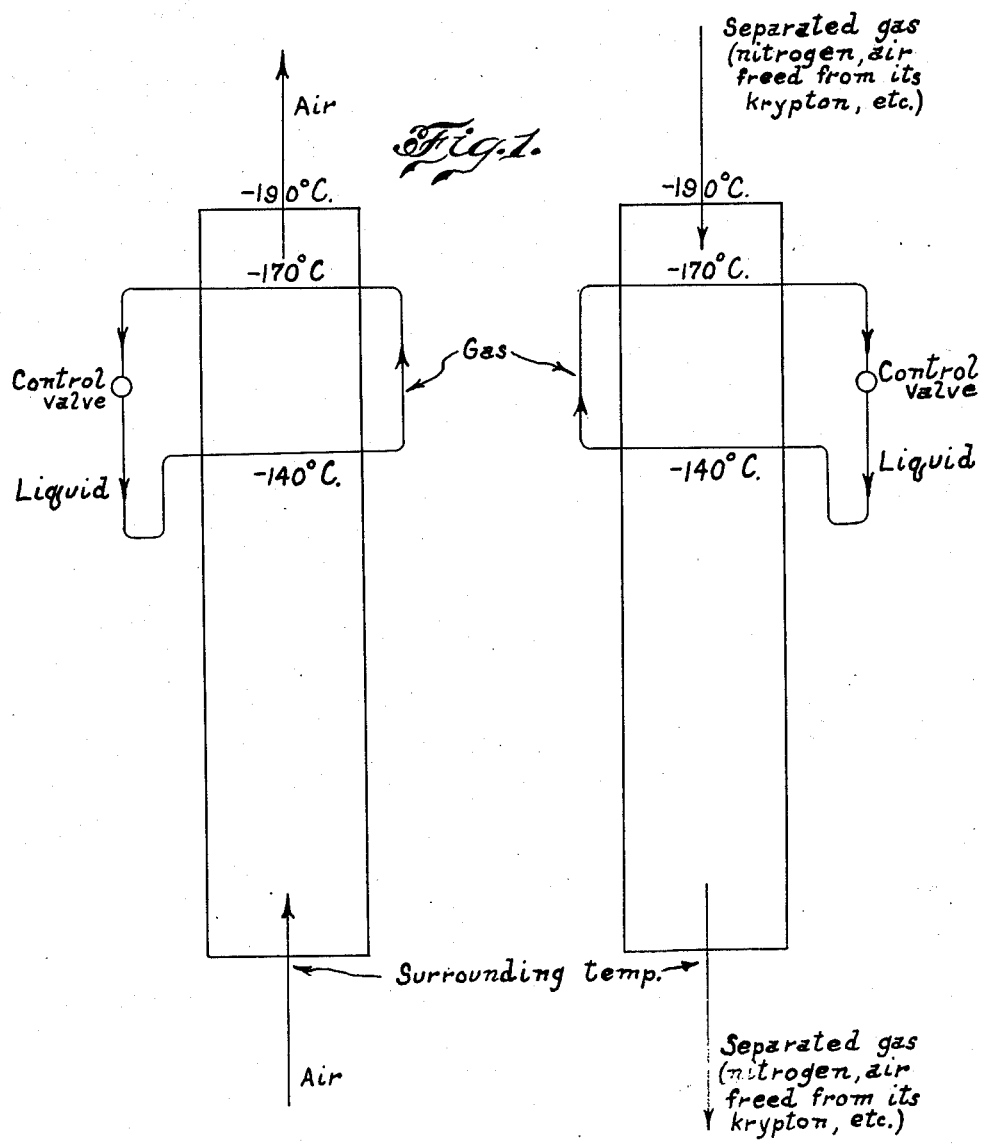

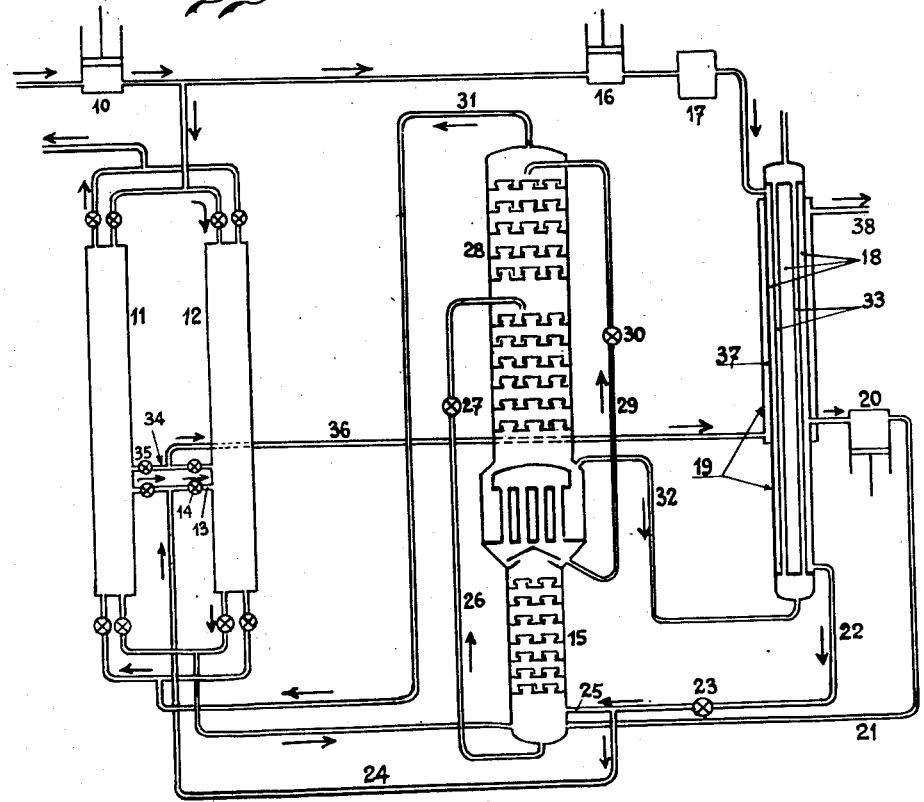

2,355,660

UNITED STATES PATENT OFFICE 2,355,660

PROCESS FOR REMOVING THE SUBSTANCES CONDENSED IN COLD ACCUMULATORS IN THE COOLING OF GASES

Jean Le Rouge, Boulogne-sur-Seine, France; vested in the Alien Property Custodian Application May 4, 1937, Serial No. 140,767
In Great Britain May 18, 1936

15 Claims. (Cl. 62—175.5)

It is known to cool gases in cold accumulators, also called recuperators or regenerators. The gas to be cooled and a cold gas to be warmed up to the surrounding temperature are alternately flowing through the cold accumulator in opposite directions, thereby alternately cooling and warming the filling mass of the cold accumulator, which may for instance consist of aluminium, so that a heat exchange takes place between the two gases through the intermediacy of this filling mass. A pair of accumulators is provided so as to allow of a continuous operation. The gas to be cooled will in the following be called the "incoming gas" throughout the specification and the cold gas to be warmed will be called the "outgoing gas." The invention relates to the case where the incoming gas contains at least one condensible constituent which condenses in the accumulator and deposits on its filling mass during the passage of the incoming gas therethrough.

The removal of the substances condensed in the cooling of the incoming gas in the accumulator is in principle effected by the flow therethrough of the outgoing gas. Let it be assumed, by way of example, that the incoming gas consists of air to be separated into its two main constituents, i. e. oxygen and nitrogen, the latter of which only will, for the purpose of simplicity, be mentioned in the following. The air contains water vapor and carbon dioxide. It flows under a pressure of about 5 atm. abs., which, as well known in the art, is necessary for carrying out its separation into its main constituents. As the air flows through the accumulator, it becomes cooler and cooler, so that there successively separate therefrom water in the liquid state, water as ice and carbon dioxide in the solid state. Considering for instance carbon dioxide, its deposition begins at the place of the accumulator where the air is sufficiently cold to become saturated therewith and progresses along the whole colder portion of the accumulator, less and less carbon dioxide of course depositing as the incoming air comes nearer the cold end of the accumulator. Assuming the pressure of the outgoing nitrogen to be 1 atm. abs., the volume of the nitrogen is substantially 5 times greater than that of the incoming air with which it is in heat exchange through the intermediacy of the filling mass of the accumulator. The sublimation of the carbon dioxide previously deposited from the air is effected by this relatively large volume of outgoing nitrogen. The portion of the cold accumulator in which this deposition and vaporisation of the condensed constituent being considered takes place will in the following be termed the "colder part" of the accumulator throughout the specification, the other portion being termed the "warmer part."

The specific heat of compressed air is greater than that of uncompressed nitrogen, specially at low temperatures. As a consequence thereof, when the masses of both gases in heat exchange are equal, the difference of the temperatures at which the two gases reach a given place of the accumulator increases substantially from the warmer to the colder end of the accumulator and is relatively important in the colder part of the accumulator, the vapor pressure of carbon dioxide is considerably smaller at the temperature at which, in this colder part, the outgoing nitrogen reaches a given point of the accumulator than at the temperature at which the incoming air reaches the same point, and, in spite of the difference of the volumes of the two gases, difficulty may be experienced in the sublimation of the carbon dioxide.

In order to lower, in the region of the cold accumulator where the deposition of solid carbon dioxide takes place, the difference of temperature between the two gases and consequently facilitate the sublimation of the carbon dioxide contained in the air to be separated into its components, it has already been proposed to pass through the cold accumulator, either over its entire length or over its colder part, that is, that part in which the carbon dioxide deposits, a quantity of the separated components larger than that of the incoming air to be separated.

The process according to the present invention enables the difference of temperature between the incoming and the outgoing gas, in the region of the cold accumulator where the deposition of solid carbon dioxide takes place, to be lowered more than does the known process. Moreover it is applicable to the removal of water vapour whereas the known process is not. In a general manner it is applicable in all cases where the difference of the temperatures of the two gases flowing through a cold accumulator should be reduced over the portion of the cold accumulator in which a condensible constituent deposits, so as to facilitate the removal of this constituent. Thus, while the behavior of the two gases has been hereinbefore described with reference to air and nitrogen as the two gases and of carbon dioxide as a condensible constituent, the process is not limited to these examples, nor to the case where the specific heat of the incoming or compressed gas is greater than that of the outgoing or expanded gas.

The process of this invention consists in subjecting at least one of the two gases, in at least one of the two parts of its path which are situated on both sides of the place where the separation of the condensible substance begins, to a thermal action which is distinct from that to which it is submitted by the other gas through the intermediacy of the accumulator, and brings its temperature nearer to the temperature prevailing in the part of its path other than that in which the thermal action is applied.

If the deposition of the condensible element to be removed only begins in the vicinity of the cold end of the accumulator, as in the case of the carbon dioxide contained in the air, it is in practice necessary to exert a cooling action, which, according to the foregoing definition of the invention, will take place in the warmer part of the accumulator, that in which the carbon dioxide has not yet deposited. For instance, a small quantity of liquid air, which, according to the pressure of the incoming air and the degree of perfection of the accumulators, is generally comprised between 1/5% and 1% of the bulk of the treated air, is added to the incoming air, in the region of the accumulator where a temperature of about —140° C. is prevailing. Again there may be added to the outgoing component a small quantity of the same component in the liquid state taken from the separating apparatus. The liquefied air or component will for instance consist of a part of the liquid formed in a liquefier by putting air under pressure or a given amount of the component under pressure in heat exchange with the incoming air or the outgoing component taken at the cold end of the cold accumulators. Through this addition of liquefied gas, the temperature difference between the incoming air and the outgoing nitrogen is suddenly reduced at the place of the addition and, at least in the vicinity of this place, is rendered smaller in the portion of the accumulator which is colder than in the portion which is warmer than this place. Now a given accumulator allows for a definite mean temperature difference between the incoming air and the outgoing gas. Thus the sudden cooling effected by the liquefied gas will allow the temperature difference between the two gases in heat exchange to be lowered in the colder part of the accumulator, where it should be as low as possible on account of the deposition and sublimation of the solid carbon dioxide, this lowering of the temperature difference being made up for by a corresponding increase thereof in the warmer part of the accumulator, where no deposition of carbon dioxide takes place. In the process formerly known and above referred to, which consists in passing through the accumulator a larger quantity of outgoing gas than of incoming air, no sudden variation of the temperature difference between the two gases takes place, so that this difference cannot be rendered as low as in the process of this invention in the region in which the solid carbon dioxide deposits. Moreover, in the process of the invention, the difference of temperatures between the two gases, although increased in the region of the accumulator in which the carbon dioxide does not yet deposit, remains sufficiently low along this whole region so that the sublimation, by the outgoing gas, of the ice which has separated from the incoming air, meets with no difficulty, whereas in the process formerly known, the temperature difference constantly increases from the colder to the warmer end of the accumulator and may be so great in the region where ice deposits that its sublimation may not proceed satisfactorily.

It is to be noted that this addition, to the entering or outgoing gas, of a cooling or heating agent modifies the quantity of these gases which flow through the accumulator. It may result therefrom that the difference of temperature between the two gases, while being suitable at the place of the addition, is no longer suitable in another part of the accumulator. For instance, the addition of liquid air to the incoming air will cause this difference of temperature to increase still more from the place of addition to the colder end of the accumulator than would take place if the quantity of the incoming air were not greater than that of the outgoing nitrogen. This drawback is removed by withdrawing from that gas which has been subjected to the addition, near the place where the addition takes place, a quantity of gas which approximates that of the added agent, and which will preferably be conveyed back to a place of the plant where a temperature near that of the withdrawn gas and a pressure lower than that of this gas are prevailing; again the quantity of the gas which is not subjected to the addition may be increased over a portion of its path through the cold accumulators, for instance, where liquid air is added to the incoming air, the quantity of the outgoing nitrogen may be increased, over its path lying between the colder end of the accumulator and the place where the liquid air is admitted, by a quantity of nitrogen equal to that of the liquid air. In both cases substantially equal quantities of incoming and outgoing gas are flowing through all parts of the accumulators.

Respecting the variation, along the accumulator, of the difference of temperature between the incoming and the outgoing gas, an action similar to that above stated caused by the addition of liquid air to the incoming air takes place in all cases where the cooling agent is added to the incoming gas or the heating agent to the outgoing gas, that is, when the thermal action exerted on the gas is of the same sense as that exerted thereon on the other hand by the gas with which it is in heat exchange through the intermediacy of the accumulator. In all these cases, assuming the specific heats of the incoming and of the outgoing gases to be equal, the addition of the heating or cooling agent causes the difference of temperature between the two gases to increase in the region of the accumulator in which the condensed substance deposits in a troublesome amount as one, in this region, gets farther from the place of the addition. In order to keep this difference substantially constant in this region, one or more secondary thermic actions of the same sense as the main one may be exerted in said region. For instance a part of the cooling or heating agent may be added at one or several places disposed along this region. When the thermal action according to this invention consists in the addition, in the warmer part of the accumulator, of a cooling agent to the incoming gas, this addition is then accompanied by the addition of another portion of the cooling agent in that portion of the colder part of the accumulator which is nearest to the warmer part, the latter cooling being itself, if desired, accompanied by a heating exerted in the remaining portion of the colder part, that in which the deposition of the condensible substance is too slight to be still troublesome. For instance, where liquid air is added to the incoming air in that part of the accumulator in which solid carbon dioxide does not yet deposit from the gaseous air, supplementary quantities of liquid air may be added to the incoming air in the colder part of the cold accumulator, where the deposition of solid carbon dioxide takes place.

The thermal action, instead of being applied directly, may also be applied by means of an indirect contact, which will preferably be effected by means of an auxiliary fluid flowing in a closed cycle between the place where the thermal action is to be applied and a source of heat or cold. The auxiliary fluid will consist of a gas under high pressure, so as to have a great capacity under a small volume, or preferably of a fluid under such a pressure as to be alternately in the gaseous state at the higher and in the liquid state at the lower of the two temperatures between which it is circulating. When the treated gaseous mixture is air and the condensible element to be sublimated carbon dioxide, the auxiliary fluid will for instance consist of oxygen, argon or krypton circulating in a closed cycle between a heat exchanger located within one cold accumulator in the region where the temperature of about $-140°$ C. is prevailing and a second heat exchanger located either in the same or in the other cold accumulator of the pair, at a place where a lower temperature, say $-160°$ C. or $-170°$ C., is prevailing. If then the cold end of the accumulators is placed at the top, and a U-shaped tube, with descending vertical branches, between the two heat exchangers between which the fluid circulates, the same will from itself circulate continuously according to the thermosiphon principle, without it being necessary to utilize a circulation pump.

As has hereinbefore been mentioned, when the incoming gas consists of air under pressure higher than atmospheric and the outgoing gas consists of an equal quantity of one or more of the constituents of air at substantially atmospheric pressure, the difference of temperature between the incoming and the outgoing gas increases as the temperature falls. It results therefrom that the difference of temperature between the incoming and the outgoing gas may have been rendered small enough by the process of the invention at the place where the condensible element begins depositing and remain however too great at the cold end of this region, even when the quantities of the two gases in heat exchange are kept equal over the whole length of the accumulator in one of the above described manners. In that case a part of the cooling agent may be added in the colder part of the accumulator in the manner above described, or the process of the invention may be combined with the known process mentioned at the beginning of this specification which consists in increasing the quantity of the outgoing gas in proportion to that of the incoming one. This will for instance take place, in the case of a thermal action effected by direct contact, by taking the added agent and the withdrawn gas in quantities which are no longer equal, as assumed hereinbefore, but on the contrary unequal. Thus, where liquid air is added to the incoming air, the quantity of the outgoing gas flowing between the colder end of the accumulator and the place thereof where the liquid air is added may be taken greater than that of the incoming air plus the liquid air.

In the foregoing description, only the case where the condensible constituent deposits at a temperature near that obtaining at the colder end of the accumulator has been discussed at length. When the condensible constituent deposits in the vicinity of the warm end of the accumulator, as does water vapor, a heating action is exerted in the colder part of the accumulator, that in which the condensible constituent deposits, preferably where the deposition no longer takes place in a troublesome amount. For instance a small quantity of the outgoing gas, formerly warmed up to the surrounding temperature and which has been brought back to its pressure at the place where the addition takes place, is added to the outgoing gas as it flows through the accumulator. A cooling and a heating action may also be simultaneously applied.

The process of the invention is illustrated by the appended drawings in which:

Fig. 1 diagrammatically shows a method of carrying out the sublimation of the carbon dioxide which condenses in cold accumulators from air to be subjected to a fractionating treatment at its liquefaction temperature;

Fig. 2 shows a method for removing from cold accumulators the carbon dioxide which has condensed therein from air to be separated into nitrogen and substantially pure oxygen by liquefaction and rectification.

In Fig. 1 the air is cooled to its dew point, that is about $-190°$ C., in a pair of cold accumulators the colder ends of which lie higher than the warmer ends. An horizontal pipe, which may be bent to any desired shape, lies in a cross section of each cold accumulator, where in operation the temperature does not substantially fall below $-140°$ C. Another horizontal pipe similarly lies in another cross section where the temperature is about $-170°$ C. Both pipes are united on one side by a vertical straight tube and on the opposite side by a vertical tube terminating below in a U-shaped tube the horizontal branch of which lies below the lower of both horizontal pipes, that which is at a temperature of about $-140°$ C. By filling the closed circuit thus constituted with a suitable quantity of a fluid consisting of oxygen, argon or krypton, all of which have a critical temperature higher than $-140°$ C., this fluid will be caused to be in the gaseous state in the lower horizontal pipe and in the liquid state in the upper one during the operation of the cold accumulator. Each of the two control valves shown is open during said operation, thus enabling the fall of the liquid of the upper horizontal pipe into the U-shaped tube. This constitutes a liquid seal for the gas of the lower horizontal pipe, which must therefore ascend through the straight vertical tube, so that, as shown by the arrows, a continuous cyclical flow of fluid through both horizontal pipes ensues according to the well-known thermosiphon principle. The circulating fluid reaches the lower horizontal pipe in the liquid state, vaporizes therein, thereby simultaneously cooling the gas flowing through the cold accumulator, further flows in the gaseous state, reaches in that state the upper horizontal pipe, liquefies therein, thereby heating the gas flowing through the cold accumulator, and further flows in the liquid state to the lower horizontal pipe, thus describing a closed path. The quantity of streaming fluid and the corresponding cooling and heating effects to which it subjects the gases flowing through the cold accumulator are regulated at will by means of the control valve.

In Fig. 1, each of both cold accumulators of the pair is provided with a separate closed circuit for the circulating fluid. Alternatively, each of both closed circuits could be made up of the higher horizontal pipe lying in one cold accumulator and of the lower horizontal pipe lying in the other cold accumulator, or one circuit only could be provided, at the same time comprising both upper and both lower horizontal pipes. In the latter case, the pipes should be so connected that the circulating fluid shall alternately flow through an upper and a lower horizontal pipe.

Fig. 2 shows the application of the invention to the process of separating air into nitrogen and substantially pure oxygen. As known, cold accumulators do not allow of the obtension of very pure separated gases, so that it is only for the returning nitrogen that cold accumulators can be used, a counter current heat exchanger being provided for transferring the cold of the recovered oxygen to a substantially equal portion of the incoming air.

The air to be separated into its two main constituents is compressed by means of the compressor 10, provided as usual with means for cooling the compressed air back to the surrounding temperature, to a pressure, say 5 atm. abs., sufficient for allowing its separation. Let it be called 100 volumes the quantity of the treated air, so that the volumes of nitrogen and oxygen contained in this air respectively amount to 79 and 21 volumes. Of the 100 volumes of compressed air, 77 volumes are alternately passed through the cold accumulators 11 and 12 provided with the usual alternating valves, the figure showing the flow of this air through the accumulator 12. 0.5 volume of air in the liquid state is conveyed through a pipe 13 controlled by a valve 14 to an intermediate place of the cold accumulator 12, where a temperature not lower than about −140° C. is prevailing. This liquid air instantaneously vaporizes, simultaneously cooling the streaming air. The whole of the resulting mixture, that is 77.5 volumes of gaseous air, leaves the cold accumulator 12 at its colder end and is introduced at the bottom of the high-pressure column 15 of a two-column apparatus of the conventional type for separating air into its two main constituents.

The 23 volumes of gaseous air which are not passed through the cold accumulator 12 are further compressed to say 30 atm. in the compressor 16, also provided as usual with cooling means. These 23 volumes are freed from their water vapour and their carbon dioxide in the purifying device 17 and passed through a compartment 18 of the counter-current heat exchanger 19. A portion, say 17 volumes, of this air, is withdrawn from this compartment at an intermediate place thereof, expanded with performance of external work in an expansion machine 20 to 5 atm. abs. and admitted through the pipe 21 at the bottom of the high-pressure column 15. The remaining portion, that is 6 volumes, of the compressed air flows further through the compartment 18 of the heat exchanger 19 and liquefies therein. These 6 volumes of air in the liquid state are withdrawn from the compartment 18 through the pipe 22, controlled by the pressure-relief valve 23. Of these 6 volumes 0.5 volume is diverted through the pipe 24 and constitutes the aforementioned liquid air introduced through the pipe 13 into the cold accumulator 12. The remaining 5.5 volumes of air in the liquid state are admitted through the pipe 25 at the bottom of the pressure column 15. The 100 volumes of compressed air thus admitted in three portions at the bottom of the high-pressure column 15 are separated therein in known manner into a liquid mixture of oxygen and nitrogen which collects at the bottom of the column 15 and is conveyed through the pipe 26 controlled by the valve 27 to an intermediate level of the low-pressure column 28, and substantially pure liquid nitrogen which is withdrawn from the high-pressure column at its top and conveyed through the pipe 29 controlled by a valve 30 to the top of the column 28. Gaseous nitrogen is withdrawn through the pipe 31 from the top of this column and gaseous oxygen through the pipe 32 from a place near its bottom. Assuming both these gases to leave the column 28 in a state of substantial purity, the quantity of nitrogen amounts to 79 volumes and that of oxygen to 21 volumes. The oxygen is passed through a compartment 33 of the counter-current heat exchanger 19 in which it gives up its cold to the incoming air. The returning nitrogen is alternately passed through each of the two cold accumulators 11 and 12, accumulator 11 in the drawings. Of the 79 volumes of nitrogen entering the cold accumulator 11, 2 volumes are withdrawn through the pipe 34 controlled by the valve 35 and conveyed through the pipe 36 to a separate compartment 37 of the heat exchanger 19 in which it gives up its cold to the incoming air before leaving through the pipe 38.

I claim:

1. In the process of cooling carbon dioxide-containing air in a cold accumulator, the step of cooling the region of the cold accumulator in which a temperature of about −140° C. is obtaining by a cooling agent other than the gas which is flowing through the cold accumulator from its colder to its warmer end, and supplied from the exterior of the cold accumulator.

2. In the process of cooling carbon dioxide-containing air in a cold accumulator, the step which consists in introducing a low-boiling liquefied gas into the cold accumulator at a place where a temperature of about −140° C. is obtaining.

3. In the process of alternately passing through a cold accumulator in reverse directions carbon dioxide-containing air to be cooled and a gas to be warmed up, the step which comprises putting an agent supplied from the exterior of the cold accumulator in heat exchange relation with the contents thereof, the temperature of said agent being lower than that at which carbon dioxide begins depositing, the place of the heat exchange being at a temperature higher than that prevailing at the place where carbon dioxide begins depositing but nevertheless nearer to that prevailing at the colder end than to that prevailing at the warmer end of the cold accumulator.

4. The process of alternately passing through a cold accumulator in reverse directions a gas to be cooled which contains a condensible constituent and a gas to be warmed up, which comprises introducing into the cold accumulator at an intermediate place thereof a fluid agent the temperature of which differs from that of the place of introduction, admixing said fluid agent with the gas flowing through the cold accumulator and removing from the cold accumulator in the vicinity of said intermediate place a portion of the gas flowing through the cold accumulator.

5. The process of alternately passing through a cold accumulator in reverse directions a gas to be cooled which contains a condensible constituent and a gas to be warmed up, which comprises circulating an auxiliary fluid in a closed cycle alternately in heat exchange relation with a place of the cold accumulator which is warmer and that part of the plant, including the cold accumulator, which is colder, than the place where the condensible substance begins depositing.

6. The process of alternately passing through a cold accumulator in reverse directions a gas to be cooled which contains a condensible constituent and a gas to be warmed up, which comprises so disposing the cold accumulator that its colder end lies upwardly, and circulating according to the thermo-siphon principle an auxiliary fluid in a closed cycle alternately in heat exchange relation with a place of the cold accumulator which is warmer and that part of the plant, including the cold accumulator, which is colder than the place where the condensible substance begins depositing.

7. The process of alternately passing through a cold accumulator in reverse directions carbon dioxide-containing air to be cooled and a gas to be warmed up, which comprises introducing a low-boiling liquefied gas into the cold accumulator at a place thereof where a temperature of about −140° C. is obtaining, and passing in the portion of the cold accumulator lying between said place and the colder end of the cold accumulator a quantity of gas to be warmed up greater than the quantity of air to be cooled.

8. In the process of cooling carbon dioxide-containing air in a cold accumulator, the step which consists in introducing air the major portion of which is in the liquefied state into said cold accumulator at an intermediate place of the cold accumulator.

9. In the process of alternately passing through a cold accumulator in reverse directions a gas to be cooled which contains a condensible constituent and a gas to be warmed up, the step which comprises putting an agent supplied from the exterior of the cold accumulator in heat exchange relation with the contents of the cold accumulator at an intermediate place thereof, the temperature of said agent differing substantially from that of said contents, said agent being air the major portion of which is in the liquefied state.

10. In the process of alternately passing through a cold accumulator in reverse directions a gas to be cooled which contains a condensible constituent and a gas to be warmed up, the step which comprises putting an agent supplied from the exterior of the cold accumulator in heat exchange relation with the contents of the cold accumulator at an intermediate place thereof, the temperature of said agent differing substantially from that of said intermediate place and lying on the same side with respect to said intermediate place as the temperature existing at the place of the cold accumulator where the condensible constituent begins depositing, said agent being air the major portion of which is in the liquefied state.

11. In the process of alternately passing through a cold accumulator in reverse directions carbon dioxide-containing air to be cooled and a gas to be warmed up, the step which comprises putting an agent supplied from the exterior of the cold accumulator in heat exchange relation with the contents of the cold accumulator at an intermediate place thereof, the temperature of said agent being lower than that at which the carbon dioxide begins depositing, said agent being air the major portion of which is in the liquefied state.

12. In the process of alternately passing through a cold accumulator in reverse directions carbon dioxide-containing air to be cooled and a gas to be warmed up, the step which comprises putting an agent supplied from the exterior of the cold accumulator in heat exchange relation with the contents thereof, the temperature of said agent being lower than that at which carbon dioxide begins depositing, the place of the heat exchange being at a temperature higher than that prevailing at the place where carbon dioxide begins depositing but nevertheless nearer to that prevailing at the colder end than to that prevailing at the warmer end of the cold accumulator, said agent being air the major portion of which is in the liquefied state.

13. In the process of cooling carbon dioxide-containing air in a cold accumulator, which comprises introducing into the cold accumulator at an intermediate place thereof air the major portion of which is in the liquefied state and at a temperature substantially lower than that of the contents of the cold accumulator at the place of introduction.

14. In the process of alternately passing through a cold accumulator in reverse directions carbon dioxide-containing air to be cooled and a gas to be warmed up, the step which comprises putting an agent supplied from the exterior of the cold accumulator in heat exchange relation with the contents of the cold accumulator at a place where the temperature is nearer to that existing at the colder end than to that existing at the warmer end of the cold accumulator, said agent being at a lower temperature than that existing at said place and being air the major portion of which is in the liquefied state.

15. In the process of alternately passing through a cold accumulator in reverse directions carbon dioxide-containing air to be cooled and a gas to be warmed up, the steps which comprise putting an agent supplied from the exterior of the cold accumulator in heat exchange relation with the contents of the cold accumulator at a place where the temperature is nearer to that existing at the colder end than to that existing at the warmer end of the cold accumulator, said agent being at a lower temperature than that existing at said place, and passing in the portion of the cold accumulator lying between said place and the colder end of said accumulator, a quantity of gas to be warmed up greater than the quantity of air to be cooled, said agent being air the major portion of which is in the liquefied state.

JEAN LE ROUGE.